United States Patent
Chen et al.

(10) Patent No.: US 11,691,284 B2
(45) Date of Patent: Jul. 4, 2023

(54) ROBOT CONTROL METHOD, COMPUTER-READABLE STORAGE MEDIUM AND ROBOT

(71) Applicant: UBTECH ROBOTICS CORP LTD, Shenzhen (CN)

(72) Inventors: Chunyu Chen, Shenzhen (CN); Yizhang Liu, Shenzhen (CN); Ligang Ge, Shenzhen (CN); Zheng Xie, Shenzhen (CN); Hongge Wang, Shenzhen (CN); Youjun Xiong, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 208 days.

(21) Appl. No.: 17/120,225

(22) Filed: Dec. 13, 2020

(65) Prior Publication Data
US 2021/0178587 A1    Jun. 17, 2021

(30) Foreign Application Priority Data
Dec. 13, 2019  (CN) .......................... 201911279287.5

(51) Int. Cl.
*B25J 9/16* (2006.01)
*B25J 13/08* (2006.01)
*B62D 57/032* (2006.01)

(52) U.S. Cl.
CPC .......... *B25J 9/1664* (2013.01); *B25J 9/1651* (2013.01); *B25J 9/1694* (2013.01); *B25J 13/085* (2013.01); *B25J 13/088* (2013.01); *B62D 57/032* (2013.01)

(58) Field of Classification Search
CPC ...... B25J 9/1664; B25J 9/1651; B25J 9/1694; B25J 13/085; B25J 13/088; B25J 9/161; B25J 13/00; B25J 13/08; B25J 9/1633; B25J 9/0006; B25J 9/1607; B62D 57/032; G05B 2219/40244; G05B 2219/40376; G05B 2219/40378; G05B 2219/40318
See application file for complete search history.

(56) References Cited

U.S. PATENT DOCUMENTS

| | | | |
|---|---|---|---|
| 2013/0173054 A1* | 7/2013 | Seo ....................... | B62D 57/032 901/1 |
| 2013/0218345 A1* | 8/2013 | Lee .......................... | B25J 9/162 700/261 |
| 2015/0202768 A1* | 7/2015 | Moridaira ............ | B62D 57/032 901/1 |
| 2018/0028861 A1* | 2/2018 | Murakoshi ........... | A61B 5/6895 |
| 2019/0070729 A1* | 3/2019 | Kamioka ............. | B62D 57/032 |

FOREIGN PATENT DOCUMENTS

| | | | |
|---|---|---|---|
| JP | 2006082155 A | * | 3/2006 |
| JP | 2017144512 A | | 8/2017 |

* cited by examiner

*Primary Examiner* — Abby Y Lin
*Assistant Examiner* — Esvinder Singh

(57) ABSTRACT

A robot control method includes: obtaining force information associated with a left foot and a right foot of the robot; calculating a zero moment point of a COM of a body of the robot based on the force information; updating a motion trajectory of the robot according to the zero moment point of the COM of the body to obtain an updated position of the COM of the body; performing inverse kinematics analysis on the updated position of the COM of the body to obtain joint angles of a left leg and a right leg of the robot; and controlling the robot to move according to the joint angles.

17 Claims, 7 Drawing Sheets

ROBOT CONTROL METHOD, COMPUTER-READABLE STORAGE MEDIUM AND ROBOT

CROSS REFERENCE TO RELATED APPLICATIONS

This application claims priority to Chinese Patent Application No. CN201911279287.5, filed Dec. 13, 2019, which is hereby incorporated by reference herein as if set forth in its entirety.

BACKGROUND

1. Technical Field

The present disclosure generally relates to robots, and particularly to a control method for controlling a biped robot.

2. Description of Related Art

Some conventional biped robots adopt position-planning based gait walking methods. In the case of interference from various external environmental forces or uneven ground, the stability of the robots is poor and it is difficult for the robots to walk stably. Therefore, there is a need to provide a robot control method to overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
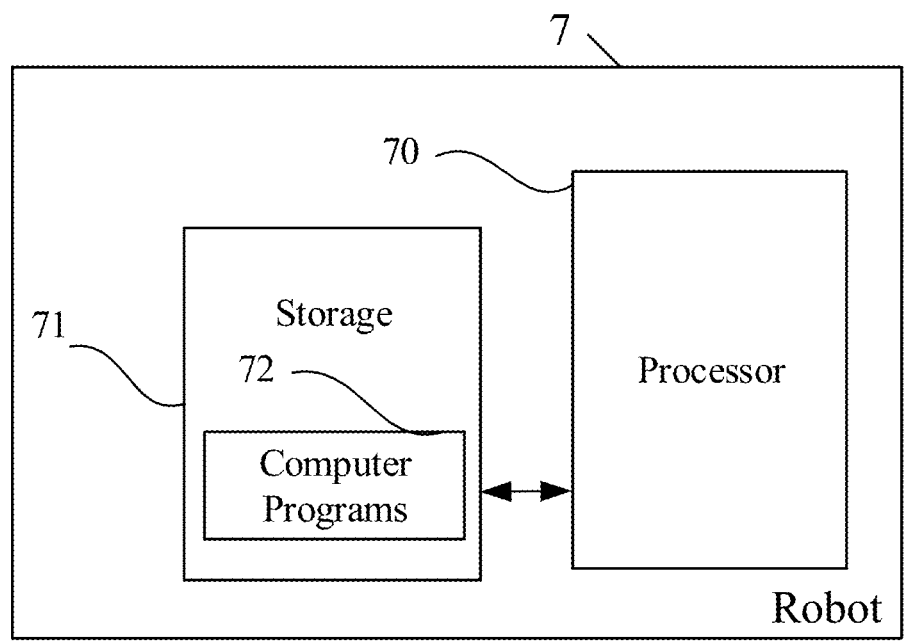
FIG. 1 is a schematic block diagram of a robot according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

The terms "upper", "lower", "left" and "right", indicating the orientational or positional relationship based on the orientational or positional relationship shown in the drawings, are merely for convenience of description, but are not intended to indicate or imply that the device or elements must have a particular orientation or be constructed and operated in a particular orientation, and therefore should not be construed as limiting the present invention. The terms "first" and "second" are used for descriptive purposes only and are not to be construed as indicating or implying relative importance or implicitly indicating the number of technical features. The meaning of "multiple" is two or more, unless expressly stated otherwise.

Figure 6:
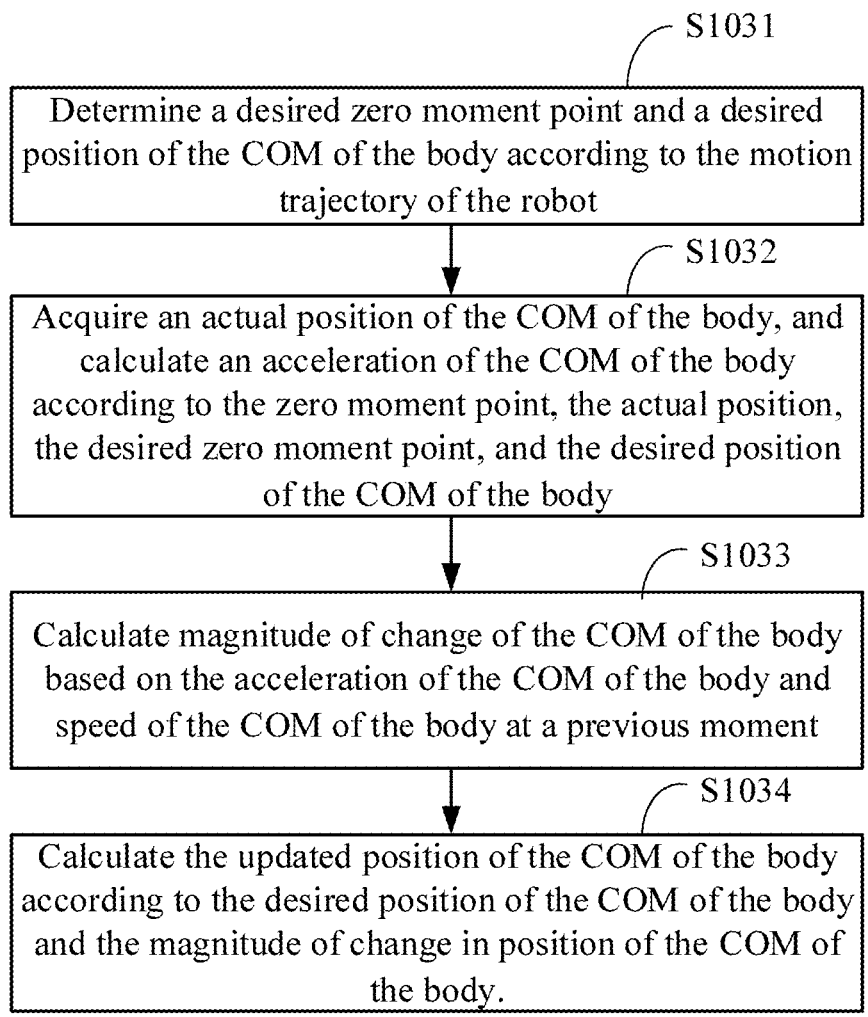
FIG. 6 is a schematic flowchart of method for updating a motion trajectory of the robot.
Figure 7:
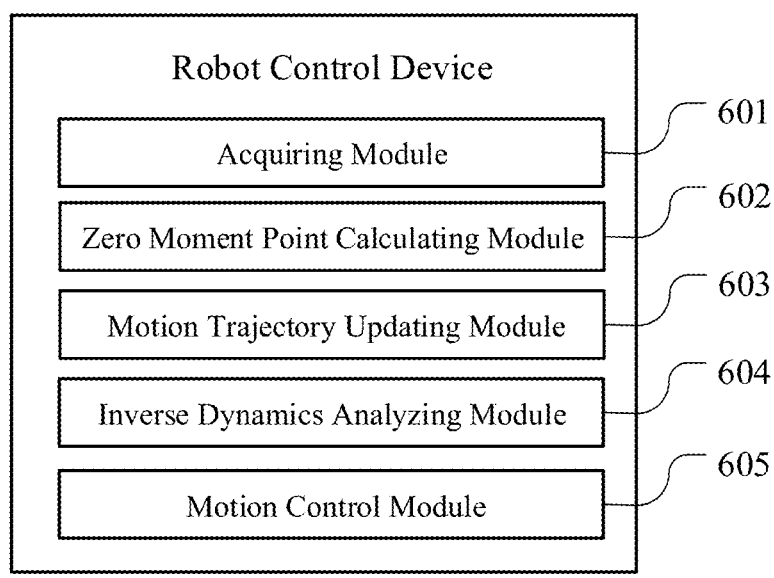
FIG. 7 is a schematic block diagram of a control device according to one embodiment.

FIG. 1 is a schematic block diagram of a robot 7 according to one embodiment. The robot 7 may be a biped robot. The robot 7 includes a processor 70, a storage 71, one or more computer programs 72 stored in the storage 71 and executable by the processor 70. When the processor 70 executes the computer programs 72, the steps in the embodiments of the method for controlling the robot 7, such as steps S101 through S105 in FIG. 2, steps S1021 to S1023 in FIG. 5, steps S1031 through S1034 in FIG. 6, and functions of modules/units in the embodiments, such as units 601 through 605 in FIG. 7, are implemented.

Exemplarily, the one or more computer programs 72 may be divided into one or more modules/units, and the one or more modules/units are stored in the storage 71 and executed by the processor 70. The one or more modules/units may be a series of computer program instruction segments capable of performing specific functions, and the instruction segments are used to describe the execution process of the one or more computer programs 72 in the robot 7. For example, the one or more computer programs 72 may be divided into an acquiring module, a zero moment point calculating module, a motion trajectory updating module, an inverse dynamics analyzing module, and a motion control module. The specific functions of each module will be described in detail later.

It should be noted that FIG. 1 is merely an example of the robot 7, and does not limit the robot 7. The robot 7 may include components different in numbers from those illustrated, or incorporate some other different components. For example, the robot 7 may further include an input and output device, a network access device, a bus, and the like.

The processor 70 may be a central processing unit (CPU), a general purpose processor, a digital signal processor (DSP), an application specific integrated circuit (ASIC), a field-programmable gate array (FPGA), a programmable logic device, a discrete gate, a transistor logic device, or a discrete hardware component. The general purpose processor may be a microprocessor or any conventional processor or the like.

The storage 71 may be an internal storage unit of the robot 7, such as a hard disk or a memory. The storage 71 may also be an external storage device of the robot 7, such as a plug-in hard disk, a smart memory card (SMC), and a secure digital (SD) card, or any suitable flash cards. Furthermore, the storage 71 may also include both an internal storage unit and an external storage device. The storage 71 is used to store computer programs, other programs, and data required by the robot. The storage 71 can also be used to temporarily store data that have been output or is about to be output.

Figure 2:
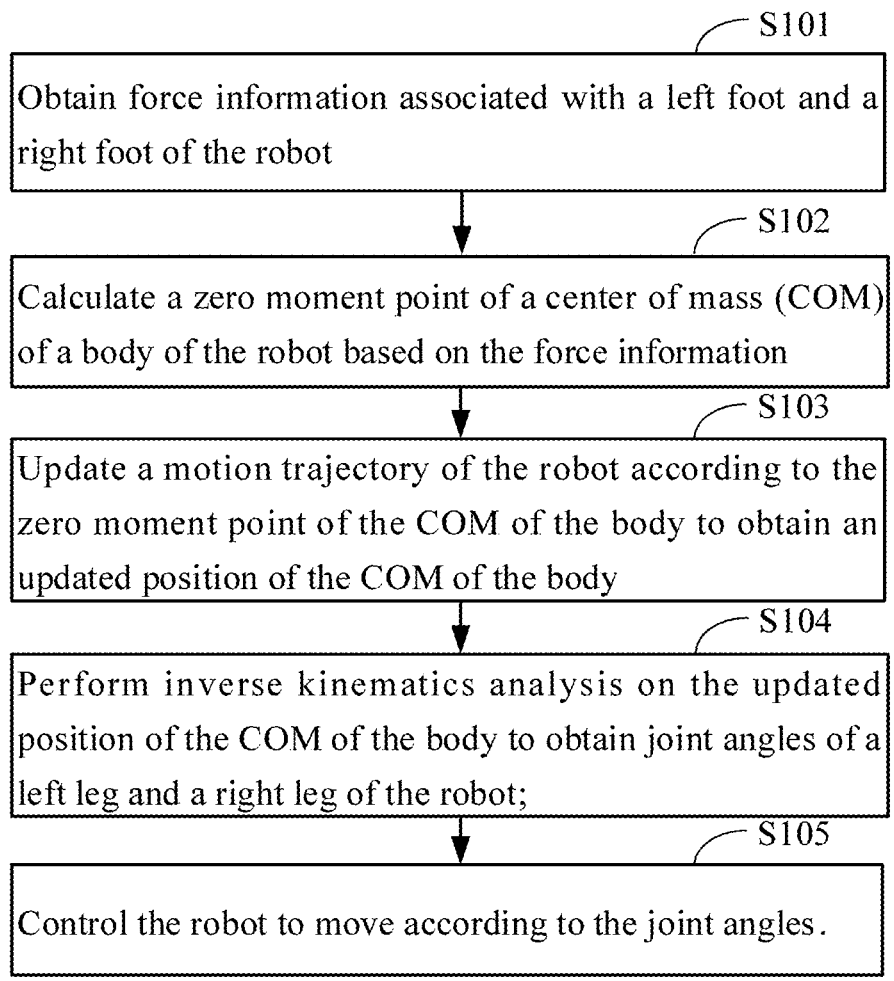
FIG. 2 is a schematic flowchart of a robot control method according to one embodiment.

FIG. 2 shows an exemplary flowchart of robot control method that may include the following steps.

Step S101: Obtain force information associated with a left foot and a right foot of the robot 7.

Figure 3:
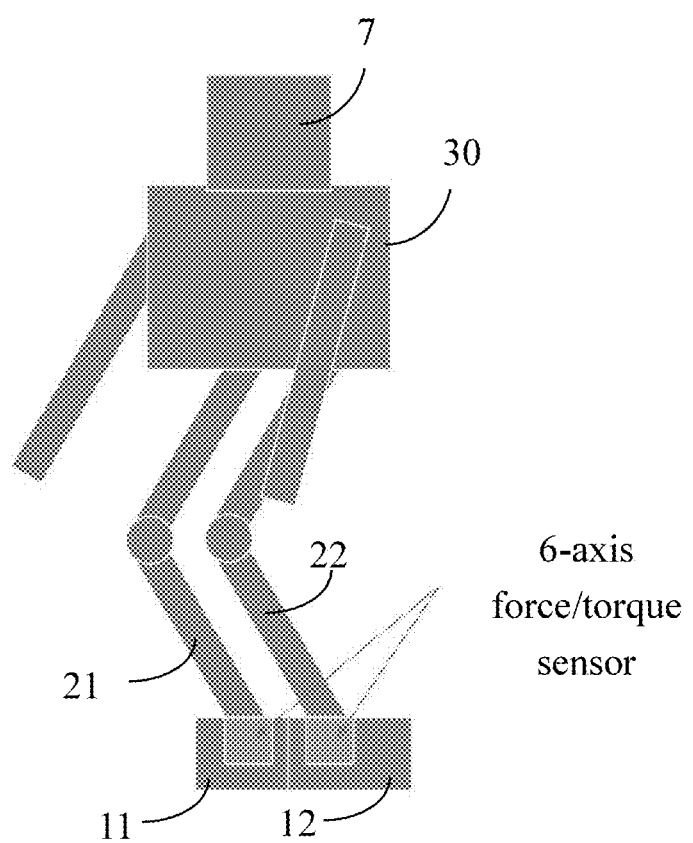
FIG. 3 is a schematic diagram showing a biped robot according to one embodiment.

In one embodiment, as shown in FIG. 3, two sensors can be respectively arranged at the connecting portions between the left foot 12 and the left leg 22 of the robot 7, and between the right foot 11 and the right leg 21 of the robot 7, so as to obtain the force information of the left foot 12 and the force information of the right foot 11 of the robot 7.

In one embodiment, the sensors may be six-axis force/torque sensors, which can detect the force information of the left foot and the force information of the right foot. For example, in a three-dimensional coordinate system shown in FIG. 4 where x-axis and y-axis lie on the sole of the left foot 12 of the robot 7 and z-axis is perpendicular to the sole of the left foot 12, the force information of the left foot 12 includes three force components on the x-axis, y-axis and z-axis, and three torque components about the three axes. The force information of the left foot can be expressed as follows:
$F_l = [f_{lx}\ f_{ly}\ f_{lz}\ \tau_{lx}\ \tau_{ly}\ \tau_{lz}]^T$, where $f_{lx}$ represents the force component of the force information of the left foot on the x-axis, $f_{ly}$ represents the force component of the force information of the left foot on the y-axis, $f_{lz}$ represents the force component of the force information of the left foot on the z-axis, $\tau_{lx}$ represents the torque component of the force information of the left foot about the x-axis, $\tau_{ly}$ represents the torque component of the force information of the left foot about the y-axis, and $\tau_{lz}$ represents the torque component of the force information of the left foot about the z-axis.

Similarly, a three-dimensional coordinate system can be established for the right foot of the robot 7 where x-axis and y-axis lie on the sole of the right foot of the robot and z-axis is perpendicular to the sole of the right foot. The force information of the right foot can be expressed as follows:
$F_r = [f_{rx}\ f_{ry}\ f_{rz}\ \tau_{rx}\ \tau_{ry}\ \tau_{rz}]^T$, where $f_{rx}$ represents the force component of the force information of the right foot on the x-axis, $f_{ry}$ represents the force component of the force information of the right foot on the y-axis, $f_{rz}$ represents the force component of the force information of the right foot on the z-axis, $\tau_{rx}$ represents the torque component of the force information of the right foot about the x-axis, $\tau_{ry}$ represents the torque component of the force information of the right foot about the y-axis, and $\tau_{rz}$ represents the torque component of the force information of the left foot about the z-axis.

Figure 4:
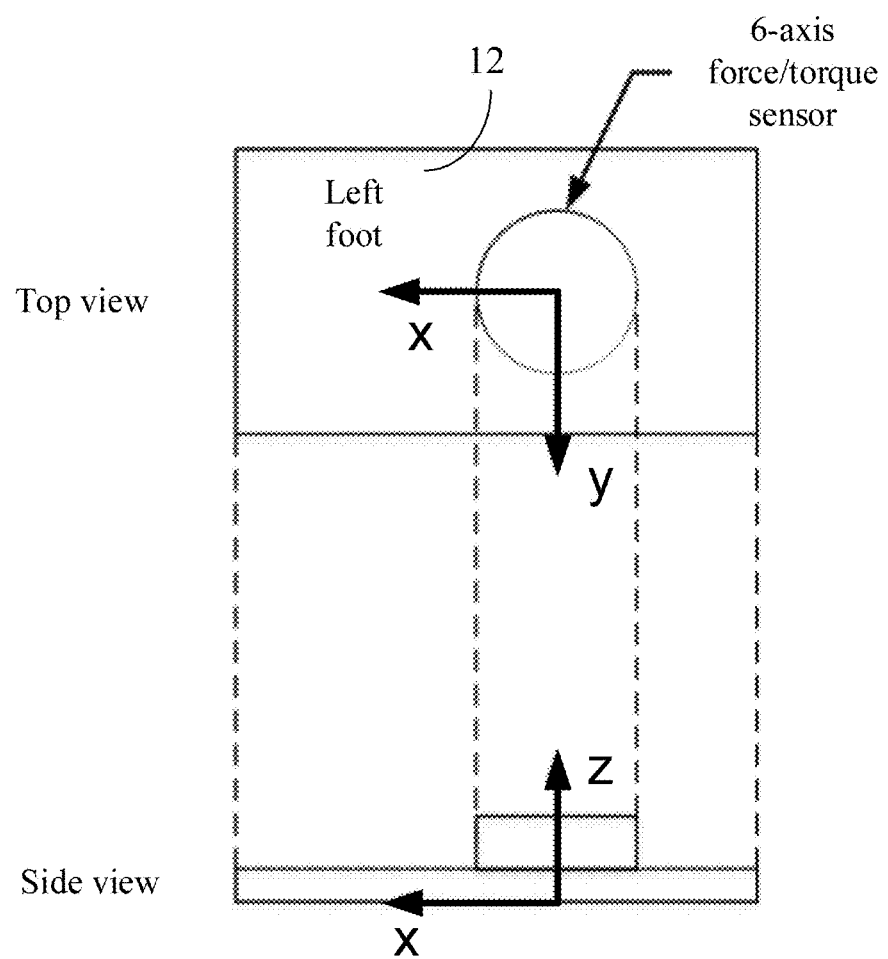
FIG. 4 shows a schematic diagram of a top view and a side view of a foot of the robot.
Figure 5:
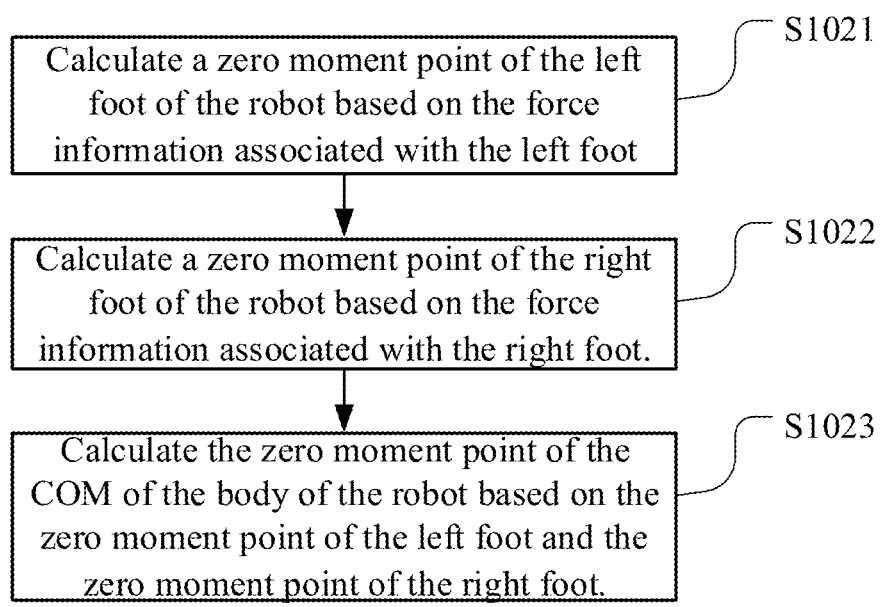
FIG. 5 is a schematic flowchart of method for calculating a zero moment point of a center of mass of a body of the robot.

Step S102: Calculate a zero moment point (ZMP) of a center of mass (COM) of a body 30 (see FIG. 3) of the robot 7 based on the force information. Referring to FIG. 5, in one embodiment, step S102 may further include the following steps:

Step S1021: Calculate a zero moment point of the left foot of the robot 7 based on the force information associated with the left foot. Specifically, the ZMP of the left foot can be calculated according to formulas as follows:
$p_{lx} = (-\tau_{ly} - f_{lx}d)/f_{lz}$; $p_{ly} = (-\tau_{lx} - f_{ly}d)/f_{lz}$; $p_l = [p_{lx}\ p_{ly}\ 0]^T$, where d represents a distance from the six-axis force/torque sensor of the left foot to the sole of the left foot, $p_{lx}$ represents an x-coordinate of the zero moment point of the left foot, $p_{ly}$ represents a y-coordinate of the zero moment point of the left foot, and $p_l$ represents the zero moment point of the left foot. In one embodiment, these variables are measured in a left foot coordinate system (e.g., a coordinate system as shown in FIG. 4).

Step S1022: Calculate a zero moment point of the right foot of the robot 7 based on the force information associated with the right foot. Specifically, the ZMP of the right foot can be calculated according to formulas as follows:
$p_{rx} = (-\tau_{ry} - f_{rx}d)/f_{rz}$; $p_{ry} = (-\tau_{rx} - f_{ry}d)/f_{rz}$;
$p_r = [p_{rx}\ p_{ry}\ 0]^T$, where d represents a distance from the six-axis force/torque sensor of the right foot to the sole of the right foot, $p_{rx}$ represents an x-coordinate of the zero moment point of the right foot, $p_{ry}$ represents a y-coordinate of the zero moment point of the right foot, and $p_r$ represents the zero moment point of the right foot. In one embodiment, these variables are measured in a right foot coordinate system where x-axis and y-axis lie on the sole of the right foot of the robot and z-axis is perpendicular to the sole of the right foot and passes through a center of the six-axis force/torque sensor on the right foot of the robot.

Step S1023: Calculate the zero moment point of the COM of the body of the robot 7 based on the zero moment point of the left foot and the zero moment point of the right foot. In one embodiment, the ZMP of the COM of the body of the robot 7 can be calculated according to formulas as follows:

$$p_{bx} = \frac{p_{rx} \times f_{rz} + p_{lx} \times f_{lz}}{f_{rz} + f_{lz}};\ p_{by} = \frac{p_{ry} \times f_{rz} + p_{ly} \times f_{lz}}{f_{rz} + f_{lz}};$$
$$p_b = [p_{bx}\ p_{by}\ 0]^T,$$

where $p_{bx}$ represents an x-coordinate of the zero moment point of the COM of the body, $p_{by}$ represents a y-coordinate of the zero moment point of the COM of the body, $p_b$ represents the zero moment point of the COM of the body. In one embodiment, the zero moment point of the COM of the body is a zero moment point measured in a COM coordinate system where the origin of the COM coordinate system lies on the COM of the body. That is, $p_{bx}$ represents a number that describes a horizontal position of the zero moment point in terms of distance and direction along the x-axis of the COM coordinate system, and $p_{by}$ represents a number that describes a horizontal position of the zero moment point in terms of distance and direction along the y-axis of the COM coordinate system.

Step S103: Update a motion trajectory of the robot 7 according to the zero moment point of the COM of the body to obtain an updated position of the COM of the body. With reference to FIG. 6, in one embodiment, step S103 may further include the following steps.

Step S1031: Determine a desired zero moment point and a desired position of the COM of the body according to the motion trajectory of the robot 7.

Step S1032: Acquire an actual position of the COM of the body, and calculate an acceleration of the COM of the body according to the zero moment point, the actual position, the desired zero moment point, and the desired position of the COM of the body. In one embodiment, the acceleration of the COM of the body on the x-axis can be calculated according to a formula as follows:
$a_x = K_{zmp}(p_{dx} - p_{bx}) + K_p(x_{dx} - x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis.

In one embodiment, the acceleration of the COM of the body on the y-axis can be calculated according to a formula as follows: $a_y = K_{zmp}(p_{dy} - p_{by}) + K_p(x_{dy} - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

Step S1033: Calculate magnitude of change of the COM of the body based on the acceleration of the COM of the body and speed of the COM of the body at a previous moment. In one embodiment, the magnitude of change in the position of the COM of the body on the x-axis can be calculated according to the following formula: $\Delta x = v_x t + \frac{1}{2} a_x t^2$, where $v_x$ represents the speed of the COM of the body on the x-axis at a previous moment, t represents running time period of a preset program, $\Delta x$ represents the magnitude of change in the position of the COM of the body on the x-axis.

Similarly, the magnitude of change in the position of the COM of the body on the y-axis can be calculated according to the following formula:
$\Delta y = v_y t + \frac{1}{2} a_y t^2$, where $v_y$ represents the speed of the COM of the body on the y-axis at a previous moment, t represents running time period of a preset program, $\Delta y$ represents the magnitude of change in the position of the COM of the body on the y-axis.

Step S1034: Calculate the updated position of the COM of the body according to the desired position of the COM of the body and the magnitude of change in position of the COM of the body.

In one embodiment, the x-coordinate of the updated position of the COM of the body can be calculated according to formula as follows: $x_{new} = x_{dx} + \Delta$, where $x_{new}$ represents the x-coordinate of the updated position of the COM of the body. The y-coordinate of the updated position of the COM of the body can be calculated according to formula as follows: $y_{new} = x_{dy} + \Delta y$, where $y_{new}$ represents the y-coordinate of the updated position of the COM of the body.

Step S104: Perform inverse kinematics analysis on the updated position of the COM of the body to obtain joint angles of a left leg and a right leg of the robot.

Inverse kinematics analysis is an analysis method commonly used in the field of robotics. For details, please refer to any conventional inverse kinematics analysis process, which will not be repeated in the present disclosure.

In one embodiment, the joint angles of the left leg include a hip joint pitch angle, a hip joint yaw angle, a hip joint roll angle, a knee joint pitch angle, an ankle joint pitch angle, and an ankle joint roll angle that are associated with the left leg. The joint angles of the left leg are expressed as follows: $\theta_l = [\theta_{l1}\ \theta_{l2}\ \theta_{l3}\ \theta_{l4}\ \theta_{l5}\ \theta_{l6}]^T$. In one embodiment, the joint angles of the right leg include a hip joint pitch angle, a hip joint yaw angle, a hip joint roll angle, a knee joint pitch angle, an ankle joint pitch angle, and an ankle joint roll angle that are associated with the right leg. The joint angles of the right leg are expressed as follows: $\theta_r = [\theta_{r1}\ \theta_{r2}\ \theta_{r3}\ \theta_{r4}\ \theta_{r5}\ \theta_{r6}]^T$.

Step S105: Control the robot 7 to move according to the joint angles.

After the joint angles associated with the left leg and the right leg are obtained, the robot 7 can be controlled to move according to the joint angles, so as to realize compliance control of the robot 7.

With the robot control method describe above, the joint angles of the robot can be adjusted in real time according to the force information of the feet of the robot, which is beneficial to improve the stability of the robot during the walking process, and allows the robot to walk stably even in the case of various external environmental forces or uneven ground, thereby improving the performance of the robot.

It should be understood that sequence numbers in the foregoing processes do not indicate execution sequences. Execution sequences of the processes should be determined according to functions and internal logic of the processes, and shall not constitute any limitation on implementation processes of the embodiments of the present application.

Referring to FIG. 7, in one embodiment, a robot control device may include an acquiring module 601, a zero moment point calculating module 602, a motion trajectory updating module 603, an inverse dynamics analyzing module 604, and a motion control module 605.

The acquiring module 601 is configured to obtain force information associated with a left foot and a right foot of the robot 7. The zero moment point calculating module 602 is configured to calculate a zero moment point of a COM of a body of the robot based on the force information. The motion trajectory updating module 603 is configured to update a motion trajectory of the robot 7 according to the zero moment point of the COM of the body to obtain an updated position of the COM of the body. The inverse dynamics analyzing module 604 is configured to perform inverse kinematics analysis on the updated position of the COM of the body to obtain joint angles of a left leg and a right leg of the robot. The motion control module 605 is configured to control the robot 7 to move according to the joint angles.

In one embodiment, the motion trajectory updating module 603 may further include a desired parameter determining module, an acceleration calculating module, a magnitude of change calculating module, and a COM position calculating module. The desired parameter determining module is configured to determine a desired zero moment point and a desired position of the COM of the body according to the motion trajectory of the robot 7. The acceleration calculating module is configured to acquire an actual position of the COM of the body, and calculate acceleration of the COM of the body according to the zero moment point, the actual position, the desired zero moment point, and the desired position of the COM of the body. The magnitude of change calculating module is configured to calculate magnitude of change in position of the COM of the body based on the acceleration of the COM of the body and speed of the COM of the body at a previous moment. The COM position calculating module is configured to calculate the updated position of the COM of the body according to the desired position of the COM of the body and the magnitude of change in position of the COM of the body.

In one embodiment, the acceleration calculating module may include a first acceleration calculating sub-module and a second acceleration calculating sub-module. The first acceleration calculating sub-module is configured to calculate the acceleration of the COM of the body on an x-axis according to a formula as follows: $a_x = K_{zmp}(p_{dx} - p_{bx}) + K_p(x_{dx} - x_{rx})$, where $p_{bx}$ represents an x-coordinate of the zero moment point of the COM of the body, $p_{dx}$ represents an x-coordinate of the desired zero moment point of the COM of the body, $x_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis.

The second acceleration calculating sub-module is configured to calculate the acceleration of the COM of the body on a y-axis according to a formula as follows: $a_y = K_{zmp}(p_{dy} - p_{by}) + K_p(x_{dy} - x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

The zero moment point calculating module 602 may include a first zero moment point calculating sub-module, a second zero moment point calculating sub-module, and a third zero moment point calculating sub-module.

The first zero moment point calculating sub-module is configured to calculate a zero moment point of the left foot of the robot based on the force information associated with the left foot. The second zero moment point calculating sub-module is configured to calculate a zero moment point of the right foot of the robot based on the force information associated with the right foot. The third zero moment point calculating sub-module is configured to calculate the zero moment point of the COM of the body of the robot based on the zero moment point of the left foot and the zero moment point of the right foot.

In one embodiment, the first zero moment point calculating sub-module can calculate the zero moment point of the left foot of the robot according to formulas as follows:
$p_{lx}=(-\tau_{ly}-f_{lx}d)/f_{lz}$;
$p_{ly}=(-\tau_{lx}-f_{ly}d)/f_{lz}$; $p_l=[p_{lx}\ p_{ly}\ 0]^T$, where d represents a distance from a six-axis force/torque sensor of the left foot to a sole of the left foot, $p_{lx}$ represents an x-coordinate of the zero moment point of the left foot, $p_{ly}$ represents a y-coordinate of the zero moment point of the left foot, $f_{lx}$ represents a component of force acting on the left foot on the x-axis, $f_{ly}$ represents a component of the force acting on the left foot on the y-axis, $f_{lz}$ represents a component of the force acting on the left foot on the z-axis, $\tau_{lx}$ represents a moment acting on the left foot around the x-axis, $\tau_{ly}$ represents a moment acting on the left foot around the y-axis, and $p_l$ represents the zero moment point of the left foot.

In one embodiment, the second zero moment point calculating sub-module can calculate the zero moment point of the right foot of the robot according to formulas as follows:
$p_{rx}=(-\tau_{ry}-f_{rx}d)/f_{rz}$; $p_{ry}=(-\tau_{rx}-f_{ry}d)/f_{rz}$;
$p_r=[p_{rx}\ p_{ry}\ 0]^T$, where d represents a distance from a six-axis force/torque sensor of the right foot to a sole of the right foot, $p_{rx}$ represents an x-coordinate of the zero moment point of the right foot, $f_{rx}$ represents a component of force acting on the right foot on the x-axis, $f_{ry}$ represents a component of the force acting on the right foot on the y-axis, $f_{rz}$ represents a component of the force acting on the right foot on the z-axis, $\tau_{rx}$ represents a moment acting on the right foot around the x-axis, $\tau_{ry}$ represents a moment acting on the right foot around the y-axis, and $p_r$ represents the zero moment point of the right foot.

In one embodiment, the third zero moment point calculating sub-module can calculate the zero moment point of the COM of the body of the robot according to formulas as follows:

$$p_{bx} = \frac{p_{rx} \times f_{rz} + p_{lx} \times f_{lz}}{f_{rz} + f_{lz}}; \quad p_{by} = \frac{p_{ry} \times f_{rz} + p_{ly} \times f_{lz}}{f_{rz} + f_{lz}}; \text{ and}$$
$$p_b = [p_{bx}\ p_{by}\ 0]^T,$$

where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_{ry}$ represents the zero moment point of the COM of the body.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals. It should be noted that, the content included in the computer readable medium could be appropriately increased and decreased according to requirements of legislation and patent practice under judicial jurisdictions. For example, in some judicial jurisdictions, the computer readable medium does not include the electric carrier signal and the telecommunication signal according to the legislation and the patent practice.

The embodiments above are only illustrative for the technical solutions of the present disclosure, rather than limiting the present disclosure. Although the present disclosure is described in detail with reference to the above embodiments, those of ordinary skill in the art should understand that they still can modify the technical solutions described in the foregoing various embodiments, or make equivalent substitutions on partial technical features; however, these modifications or substitutions do not make the nature of the corresponding technical solution depart from the spirit and scope of technical solutions of various embodiments of the present disclosure, and all should be included within the protection scope of the present disclosure.

What is claimed is:

1. A computer-implemented method executed by one or more processors of a robot, the method comprising:
   obtaining force information associated with a left foot and a right foot of the robot, wherein the force information is obtained by sensors respectively arranged at connecting portions between the left foot and a left leg of the robot, and between the right foot and a right leg of the robot;
   calculating a zero moment point of a center of mass (COM) of a body of the robot based on the force information;
   updating a motion trajectory of the robot according to the zero moment point of the COM of the body to obtain an updated position of the COM of the body;
   performing inverse kinematics analysis on the updated position of the COM of the body to obtain joint angles of the left leg and the right leg of the robot; and
   controlling the robot to move according to the joint angles;
   wherein updating the motion trajectory of the robot according to the zero moment point of the COM of the body to obtain the updated position of the COM of the body, comprises:
     determining a desired zero moment point and a desired position of the COM of the body according to the motion trajectory of the robot;
     acquiring an actual position of the COM of the body, and calculating acceleration of the COM of the body according to the zero moment point, the actual position, the desired zero moment point, and the desired position of the COM of the body;
     calculating magnitude of change in position of the COM of the body based on the acceleration of the COM of the body and speed of the COM of the body at a previous moment; and
     calculating the updated position of the COM of the body according to the desired position of the COM of the body and the magnitude of change in position of the COM of the body.

2. The computer-implemented method according to claim 1, wherein calculating acceleration of the COM of the body according to the zero moment point, the actual position, the desired zero moment point, and the desired position of the COM of the body, comprises:
   calculating the acceleration of the COM of the body on an x-axis according to a formula as follows: $a_x = K_{zmp}(p_{dx} - p_{bx}) + K_p(X_{dx} - X_{rx})$ where $p_{bx}$ represents an x-coordinate of the zero moment point of the COM of the body, $p_{dx}$ represents an x-coordinate of the desired zero moment point of the COM of the body, $X_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis; and
   calculating the acceleration of the COM of the body on a y-axis according to a formula as follows: $a_y = K_{zmp}(p_{dy} - p_{by}) + K_p(X_{dy} - X_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $X_{dy}$ represents a y-coordinate of the desired position of the COM of the body, and $a_y$ represents the acceleration of the COM of the body on the y-axis.

3. The computer-implemented method according to claim 1, wherein calculating the zero moment point of the COM of the body of the robot based on the force information, comprises:
   calculating a zero moment point of the left foot of the robot based on the force information associated with the left foot;
   calculating a zero moment point of the right foot of the robot based on the force information associated with the right foot; and
   calculating the zero moment point of the COM of the body of the robot based on the zero moment point of the left foot and the zero moment point of the right foot.

4. The computer-implemented method according to claim 3, wherein the zero moment point of the left foot of the robot is calculated according to formulas as follows:

$$p_{lx}=(-\tau_{ly}-f_{lx}d)/f_{lz};$$

$$p_{ly}=(-\tau_{lx}-f_{ly}d)/f_{lz};$$

$$p_l=[p_{lx}\, p_{ly}\, 0]^T;$$

where d represents a distance from a six-axis force/torque sensor of the left foot to a sole of the left foot, $p_{lx}$ represents an x-coordinate of the zero moment point of the left foot, $p_{ly}$ represents a y-coordinate of the zero moment point of the left foot, $f_{lx}$ represents a component of force acting on the left foot on the x-axis, $f_{ly}$ represents a component of the force acting on the left foot on the y-axis, $f_{lz}$ represents a component of the force acting on the left foot on the z-axis, $\tau_{lx}$ represents a moment acting on the left foot around the x-axis, $\tau_{ly}$ represents a moment acting on the left foot around the y-axis, and $p_l$ represents the zero moment point of the left foot.

5. The computer-implemented method according to claim 3, wherein the zero moment point of the right foot of the robot is calculated according to formulas as follows:

$$p_{rx}=(-\tau_{ry}-f_{rx}d)/f_{rz};$$

$$p_{ry}=(-\tau_{rx}-f_{ry}d)/f_{rz};$$

$$p_r=[p_{rx}\, p_{ry}\, 0]^T;$$

where d represents a distance from a six-axis force/torque sensor of the right foot to a sole of the right foot, $p_{rx}$ represents an x-coordinate of the zero moment point of the right foot, $p_{ry}$ represents a y-coordinate of the zero moment point of the right foot, $f_{rx}$ represents a component of force acting on the right foot on the x-axis, $f_{ry}$ represents a component of the force acting on the right foot on the y-axis, $f_{rz}$ represents a component of the force acting on the right foot on the z-axis, $\tau_{rx}$ represents a moment acting on the right foot around the x-axis, $\tau_{ry}$ represents a moment acting on the right foot around the y-axis, and $p_r$ represents the zero moment point of the right foot.

6. The computer-implemented method according to claim 3, wherein the zero moment point of the COM of the body of the robot is calculated according to formulas as follows:

$$p_{bx} = \frac{p_{rx} \times f_{rz} + p_{lx} \times f_{lz}}{f_{rz} + f_{lz}};\ p_{by} = \frac{p_{ry} \times f_{rz} + p_{ly} \times f_{lz}}{f_{rz} + f_{lz}};\text{ and}$$

$$p_b = [\, p_{bx}\ \ p_{by}\ \ 0\,]^T,$$

where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_b$ represents the zero moment point of the COM of the body.

7. A non-transitory computer-readable storage medium storing one or more programs to be executed in a robot, the one or more programs, when being executed by one or more processors of the robot, causing the robot to perform processing comprising:

obtaining force information associated with a left foot and a right foot of the robot, wherein the force information is obtained by sensors respectively arranged at connecting portions between the left foot and a left leg of the robot, and between the right foot and a right leg of the robot;

calculating a zero moment point of a center of mass (COM) of a body of the robot based on the force information;

updating a motion trajectory of the robot according to the zero moment point of the COM of the body to obtain an updated position of the COM of the body;

performing inverse kinematics analysis on the updated position of the COM of the body to obtain joint angles of the left leg and the right leg of the robot; and controlling the robot to move according to the joint angles;

wherein updating the motion trajectory of the robot according to the zero moment point of the COM of the body to obtain the updated position of the COM of the body, comprises:

determining a desired zero moment point and a desired position of the COM of the body according to the motion trajectory of the robot;

acquiring an actual position of the COM of the body, and calculating acceleration of the COM of the body according to the zero moment point, the actual position, the desired zero moment point, and the desired position of the COM of the body;

calculating magnitude of change in position of the COM of the body based on the acceleration of the COM of the body and speed of the COM of the body at a previous moment; and calculating the updated position of the COM of the body according to the desired position of the COM of the body and the magnitude of change in the position of the COM of the body.

8. The non-transitory computer-readable storage medium according to claim 7, wherein calculating acceleration of the COM of the body according to the zero moment point, the actual position, the desired zero moment point, and the desired position of the COM of the body, comprises:

calculating the acceleration of the COM of the body on an x-axis according to a formula as follows: $a_x=K_{zmp}(p_{dx}-p_{bx})+K_p(X_{dx}-X_{rx})$ where $p_{bx}$ represents an x-coordinate of the zero moment point of the COM of the body, $p_{dx}$ represents an x-coordinate of the desired zero moment point of the COM of the body, $X_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis; and calculating the acceleration of the COM of the body on a y-axis according to a formula as follows: $a_y=K_{zmp}(p_{dy}-p_{by})+K_p(x_{dy}-x_{ry})$, where $p_{by}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

9. The non-transitory computer-readable storage medium according to claim 7, wherein calculating the zero moment point of the COM of the body of the robot based on the force information, comprises:
  calculating a zero moment point of the left foot of the robot based on the force information associated with the left foot;
  calculating a zero moment point of the right foot of the robot based on the force information associated with the right foot; and
  calculating the zero moment point of the COM of the body of the robot based on the zero moment point of the left foot and the zero moment point of the right foot.

10. The non-transitory computer-readable storage medium according to claim 9, wherein the zero moment point of the left foot of the robot is calculated according to formulas as follows:

$$p_{lx}=(-\tau_{ly}-f_{lx}d)/f_{lz};$$

$$p_{ly}=(-\tau_{lx}-f_{ly}d)/f_{lz};$$

$$p_l=[p_{lx} p_{ly} 0]^T;$$

where d represents a distance from a six-axis force/torque sensor of the left foot to a sole of the left foot, $p_{lx}$ represents an x-coordinate of the zero moment point of the left foot, $p_{ly}$ represents a y-coordinate of the zero moment point of the left foot, $f_{lx}$ represents a component of force acting on the left foot on the x-axis, $f_{ly}$ represents a component of the force acting on the left foot on the y-axis, $f_{lz}$ represents a component of the force acting on the left foot on the z-axis, $\tau_{lx}$ represents a moment acting on the left foot around the x-axis, $\tau_{ly}$ represents a moment acting on the left foot around the y-axis, and $p_l$ represents the zero moment point of the left foot.

11. The non-transitory computer-readable storage medium according to claim 9, wherein the zero moment point of the right foot of the robot is calculated according to formulas as follows:

$$p_{rx}=(-\tau_{ry}-f_{rx}d)/f_{rz};$$

$$p_{ry}=(-\tau_{rx}-f_{ry}d)/f_{rz};$$

$$p_r=[p_{rx} p_{ry} 0]^T;$$

where d represents a distance from a six-axis force/torque sensor of the right foot to a sole of the right foot, $p_{rx}$ represents an x-coordinate of the zero moment point of the right foot, $p_{ry}$ represents a y-coordinate of the zero moment point of the right foot, $f_{rx}$ represents a component of force acting on the right foot on the x-axis, $f_{ry}$ represents a component of the force acting on the right foot on the y-axis, $f_{rz}$ represents a component of the force acting on the right foot on the z-axis, $\tau_{rx}$ represents a moment acting on the right foot around the x-axis, $\tau_{ry}$ represents a moment acting on the right foot around the y-axis, and $p_r$ represents the zero moment point of the right foot.

12. The non-transitory computer-readable storage medium according to claim 9, wherein the zero moment point of the COM of the body of the robot is calculated according to formulas as follows:

$$p_{bx} = \frac{p_{rx} \times f_{rz} + p_{lx} \times f_{lz}}{f_{rz} + f_{lz}}; p_{by} = \frac{p_{ry} \times f_{rz} + p_{ly} \times f_{lz}}{f_{rz} + f_{lz}}; \text{ and}$$

$$p_b = [p_{bx} p_{by} 0]^T,$$

where $p_{bx}$ represents an x-coordinate of the zero moment point of the COM of the body, $p_{by}$ represents a y-coordinate of the zero moment point of the COM of the body, $f_{lz}$ represents a component of the force acting on the left foot on the z-axis, $f_{rz}$ represents a component of the force acting on the right foot on the z-axis, $p_{lx}$ represents an x-coordinate of the zero moment point of the left foot, $p_{ly}$ represents a y-coordinate of the zero moment point of the left foot, $p_{rx}$ represents an x-coordinate of the zero moment point of the right foot, $p_{ry}$ represents a y-coordinate of the zero moment point of the right foot, $p_b$ represents the zero moment point of the COM of the body.

13. A robot comprising:
  one or more processors;
  a memory; and
  one or more programs, wherein the one or more programs are stored in the memory and configured to be executed by the one or more processors, the one or more programs comprises:
  instructions for obtaining force information associated with a left foot and a right foot of the robot, wherein the force information is obtained by sensors respectively arranged at connecting portions between the left foot and a left leg of the robot, and between the right foot and a right leg of the robot;
  instructions for calculating a zero moment point of a center of mass (COM) of a body of the robot based on the force information;
  instructions for updating a motion trajectory of the robot according to the zero moment point of the COM of the body to obtain an updated position of the COM of the body;
  instructions for performing inverse kinematics analysis on the updated position of the COM of the body to obtain joint angles of the left leg and the right leg of the robot; and
  instructions for controlling the robot to move according to the joint angles;
  wherein updating the motion trajectory of the robot according to the zero moment point of the COM of the body to obtain the updated position of the COM of the body, comprises:
    determining a desired zero moment point and a desired position of the COM of the body according to the motion trajectory of the robot;
    acquiring an actual position of the COM of the body, and calculating acceleration of the COM of the body according to the zero moment point, the actual position, the desired zero moment point, and the desired position of the COM of the body;
    calculating magnitude of change in position of the COM of the body based on the acceleration of the COM of the body and speed of the COM of the body at a previous moment; and
    calculating the updated position of the COM of the body according to the desired position of the COM of the body and the magnitude of change in position of the COM of the body.

14. The robot according to claim 13, wherein calculating acceleration of the COM of the body according to the zero moment point, the actual position, the desired zero moment point, and the desired position of the COM of the body, comprises:

calculating the acceleration of the COM of the body on an x-axis according to a formula as follows: $a_x = K_{zmp}(p_{dx} - p_{bx}) + K_p(X_{dx} - x_{rx})$ where $p_{bx}$ represents an x-coordinate of the zero moment point of the COM of the body, $p_{dx}$ represents an x-coordinate of the desired zero moment point of the COM of the body, $X_{rx}$ represents an x-coordinate of the actual position of the COM of the body, $x_{dx}$ represents an x-coordinate of the desired position of the COM of the body, $K_{zmp}$ represents a preset first coefficient, $K_p$ represents a preset second coefficient, $a_x$ represents the acceleration of the COM of the body on the x-axis; and calculating the acceleration of the COM of the body on a y-axis according to a formula as follows: $a_y = K_{zmp}(P_{dy} - P_{by}) + K_p(X_{dy} - x_{ry})$, where $p_{bx}$ represents a y-coordinate of the zero moment point of the COM of the body, $p_{dy}$ represents a y-coordinate of the desired zero moment point of the COM of the body, $x_{ry}$ represents a y-coordinate of the actual position of the COM of the body, $x_{dy}$ represents a y-coordinate of the desired position of the COM of the body, and $a_y$ represents the acceleration of the COM of the body on the y-axis.

15. The robot according to claim 13, wherein calculating the zero moment point of the COM of the body of the robot based on the force information, comprises:

calculating a zero moment point of the left foot of the robot based on the force information associated with the left foot;

calculating a zero moment point of the right foot of the robot based on the force information associated with the right foot; and calculating the zero moment point of the COM of the body of the robot based on the zero moment point of the left foot and the zero moment point of the right foot.

16. The robot according to claim 15, wherein the zero moment point of the left foot of the robot is calculated according to formulas as follows:

$$p_{lx} = (-\tau_{ly} - f_{lx}d)/f_{lz};$$

$$p_{ly} = (-\tau_{lx} - f_{ly}d)/f_{lz};$$

$$p_l = [p_{lx} p_{ly} 0]^T;$$

where d represents a distance from a six-axis force/torque sensor of the left foot to a sole of the left foot, $p_{lx}$ represents an x-coordinate of the zero moment point of the left foot, $p_{ly}$ represents a y-coordinate of the zero moment point of the left foot, $f_{lx}$ represents a component of force acting on the left foot on the x-axis, $f_{ly}$ represents a component of the force acting on the left foot on the y-axis, $f_{lz}$ represents a component of the force acting on the left foot on the z-axis, $\tau_{lx}$ represents a moment acting on the left foot around the x-axis, $\tau_{ly}$ represents a moment acting on the left foot around the y-axis, and $p_l$ represents the zero moment point of the left foot.

17. The robot according to claim 15, wherein the zero moment point of the right foot of the robot is calculated according to formulas as follows:

$$p_{rx} = (-\tau_{ry} - f_{rx}d)/f_{rz};$$

$$p_{ry} = (-\tau_{rx} - f_{ry}d)/f_{rz};$$

$$p_r = [p_{rx} p_{ry} 0]^T;$$

where d represents a distance from a six-axis force/torque sensor of the right foot to a sole of the right foot, $p_{rx}$ represents an x-coordinate of the zero moment point of the right foot, $p_{ry}$ represents a y-coordinate of the zero moment point of the right foot, $f_{rx}$ represents a component of force acting on the right foot on the x-axis, $f_{ry}$ represents a component of the force acting on the right foot on the y-axis, $f_{rz}$ represents a component of the force acting on the right foot on the z-axis, $\tau_{rx}$ represents a moment acting on the right foot around the x-axis, $\tau_{ry}$ represents a moment acting on the right foot around the y-axis, and $p_r$ represents the zero moment point of the right foot.

* * * * *